United States Patent [19]
Shaffer et al.

[11] Patent Number: 5,940,483
[45] Date of Patent: Aug. 17, 1999

[54] SYSTEM AND METHOD FOR INITIALIZING ISDN TERMINALS

[75] Inventors: Shmuel Shaffer, Palo Alto; Selena Dilley, San Jose, both of Calif.

[73] Assignee: Siemens Information and Communication Networks, Inc., Boca Raton, Fla.

[21] Appl. No.: 08/914,404

[22] Filed: Aug. 19, 1997

[51] Int. Cl.[6] .................................................. H04M 15/00
[52] U.S. Cl. ........................... 379/130; 379/114; 379/201
[58] Field of Search .................................... 379/201, 207, 379/111–114, 130, 133–134, 156–157

[56] References Cited

U.S. PATENT DOCUMENTS

| | | | |
|---|---|---|---|
| 5,001,710 | 3/1991 | Gawrys et al. | 379/201 |
| 5,012,466 | 4/1991 | Buhrke et al. | 370/62 |
| 5,355,404 | 10/1994 | LeDuc et al. | 379/201 |
| 5,485,511 | 1/1996 | Iglehart et al. | 379/201 |
| 5,509,067 | 4/1996 | Murata et al. | 379/355 |
| 5,541,986 | 7/1996 | Hou | 379/201 |

*Primary Examiner*—Curtis A. Kuntz
*Assistant Examiner*—Duc Nguyen

[57] ABSTRACT

A method and system for initializing ISDN terminals include selecting a set of call service features and formulating a keymap, the keymap constituting a correlation between the selected service features and feature keys associated with the terminal. The keymap is entered into a memory of the terminal and is uploaded from the terminal to a central office without the necessity of a database administrator entering the keymap data into a central office database. Communication between the terminal and the central office can be facilitated by a universal SPID. After the keymap is uploaded, the central office downloads a SPID unique to the terminal for use in future calls made from the terminal. After the initialization of the terminal is complete, the selection of ISDN service features and the keymap may be revised by entering updated keymap data into the terminal memory and uploading the updated data from the terminal to the central office. Additionally, the terminal may be moved from the ISDN line on which it was first initialized to a second ISDN remote from the first line. The terminal may then be initialized by simply uploading the service and keymap data stored in the terminal memory to the central office or, if the data has been revised, by uploading the updated service and keymap data to the central office.

20 Claims, 3 Drawing Sheets

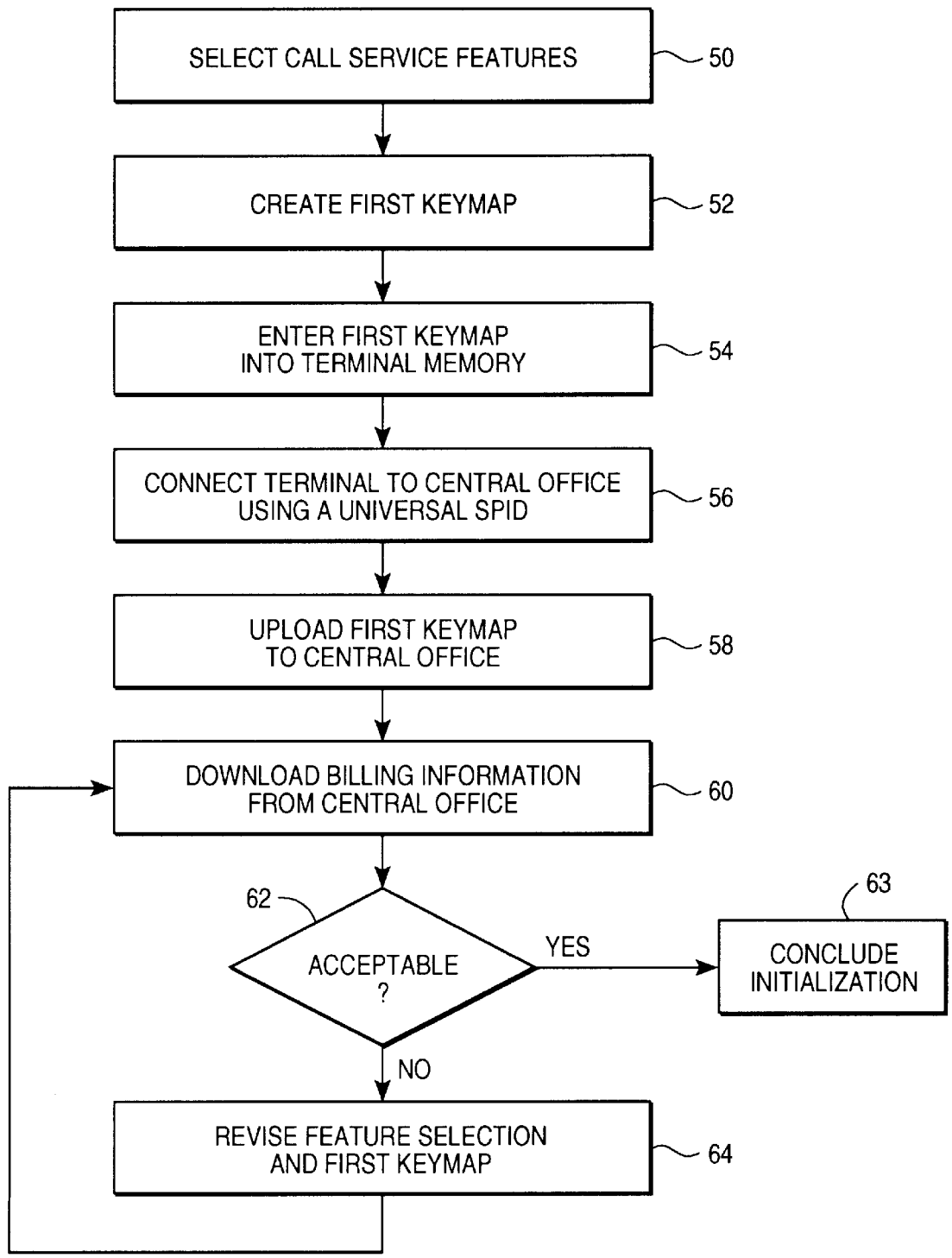
FIG_2

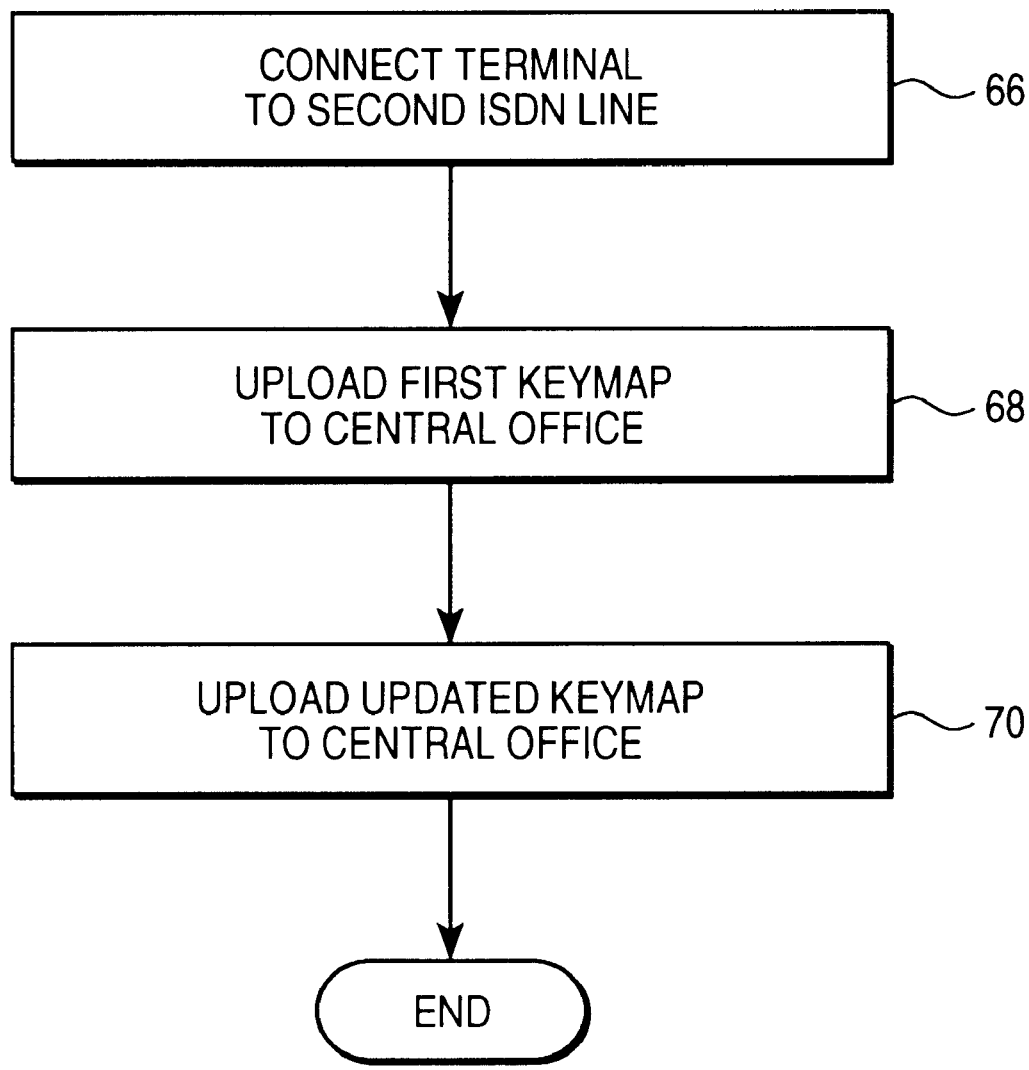
FIG_3

SYSTEM AND METHOD FOR INITIALIZING ISDN TERMINALS

BACKGROUND OF THE INVENTION

The invention relates generally to telecommunications systems and methods, and more specifically to methods and systems for initializing ISDN terminals.

DESCRIPTION OF THE RELATED ART

In analog switching systems, data defining the call service features for a particular subscriber are based upon an equipment number ascribed to the line connecting the terminal to the switching system. In an Integrated Digital Services Network (ISDN), multiple terminals are connectable on a single Basic Rate Interface (BRI) line, each terminal having the capability of possessing a unique set of call feature services. The per-line service definition of analog switching systems is incompatible with the needs of a single-line ISDN subscriber who requires multiple terminals with different sets of call feature services, because per-line service definition restricts the line to one set of call service features. Instead, in an ISDN, the subscriber cooperates with a central office to initialize each ISDN terminal, thereby identifying to the central office and receiving from the central office the set of call service features, directory numbers, a Service Profile Identifier (SPID), and a keymap, which collectively constitute a Terminal Service Profile (TSP).

The first step in initializing an ISDN terminal (such as a feature phone or a personal computer) is placing a service order with the phone company communicating to the central office the call service features which the subscriber desires and what will be the keymap for the terminal. The keymap represents the correlation between each call service feature and a corresponding feature key on a faceplate or keyboard of the terminal. The central office assigns a SPID and a directory number to the terminal. After the keymap has been communicated to the central office, a database administrator enters the information into a database at the central office. The subscriber prepares the terminal by pre-initializing it with the SPID and selected key initialization for local functions as well as for central office features. When the pre-initialization of the terminal is complete, the subscriber transmits the SPID assigned to the terminal over a D-channel of the ISDN to the central office with a request for the central office to download the keyboard configuration, or keymap.

If the subscriber wishes to update the TSP by adding or removing a call service feature, the subscriber must place a service order with the central office and repeat the steps of pre-initializing the terminal and placing a D-channel call to request a download of the updated keymap. A database administrator enters the update into the database at the central office, and the subscriber must wait until the service order is processed before the updated service is activated. If the subscriber moves the ISDN terminal from the ISDN line where it was initialized to a second ISDN line, the subscriber must go through the entire initialization process performed on the first line to obtain the same service features and keymap on the second line.

The current method for initializing ISDN terminals provides a subscriber with a wide array of call service feature options and the flexibility to configure the keymap as the subscriber pleases. However, the current method also requires a duplication of effort, since the subscriber must initialize the terminal for a keymap and a database administrator at the central office must enter this information into a database during the first initialization of the terminal. Updating the keymap and connecting the terminal to a second line both also require a substantial duplication of effort by the subscriber and the central office. Additionally, the subscriber must wait until a service order is processed before the service is either activated or updated.

What is needed is a system and method for initializing ISDN terminals which do not require a duplication of effort by the subscriber and the central office and which reduce the administrative lag time between a subscriber's request for service or a service update and the activation of that service.

SUMMARY OF THE INVENTION

A method and system for initializing an ISDN terminal include entering data into a memory of the terminal, wherein the data is representative of selections of ISDN service features and a first keymap that includes assignments of the ISDN service features to feature keys of the ISDN terminal. A first ISDN line is then established to connect the ISDN terminal to a central office. A universal SPID is transmitted to the central office to facilitate communication between the ISDN terminal and the central office. The selection of features and the first keymap are uploaded from the memory of the ISDN terminal to the central office via the first ISDN line. After the central office receives the uploaded keymap, the central office transmits a unique SPID specific to the ISDN terminal. Alternatively, if the subscriber already has a unique SPID specific to the terminal, the subscriber transmits the unique SPID together with the uploaded information. Because the keymap data is stored in memory, the ISDN terminal can be initialized at a second site by merely repeating the uploading process after the terminal has been relocated to the second site. This second uploading is accomplished via a second ISDN line that is remote from the first ISDN line.

According to another aspect of the invention, updated TSPs and keymaps are also uploaded to the central office. After the original initialization of the ISDN terminal is completed, updated data may be entered into the memory of the ISDN terminal, with the updated data being representative of an updated TSP and an updated keymap. The data is uploaded to the central office via an ISDN line. Typically, the uploads utilize the D-channel of the ISDN line.

A system for initializing the ISDN terminal includes an input device and the memory for entering and storing the data representative of the features and the keymap selected by the subscriber. The system also includes circuitry connected to the memory for identifying and uploading the TSP and keymap to the central office that supports the ISDN terminal.

BRIEF DESCRIPTION OF THE DRAWINGS

FIG. 2 is a flow diagram of a method for initializing an ISDN terminal according to the present invention.

FIG. 3 is a flow diagram of a method of establishing operation of the same ISDN terminal at a second location.

DETAILED DESCRIPTION

Figure 1:
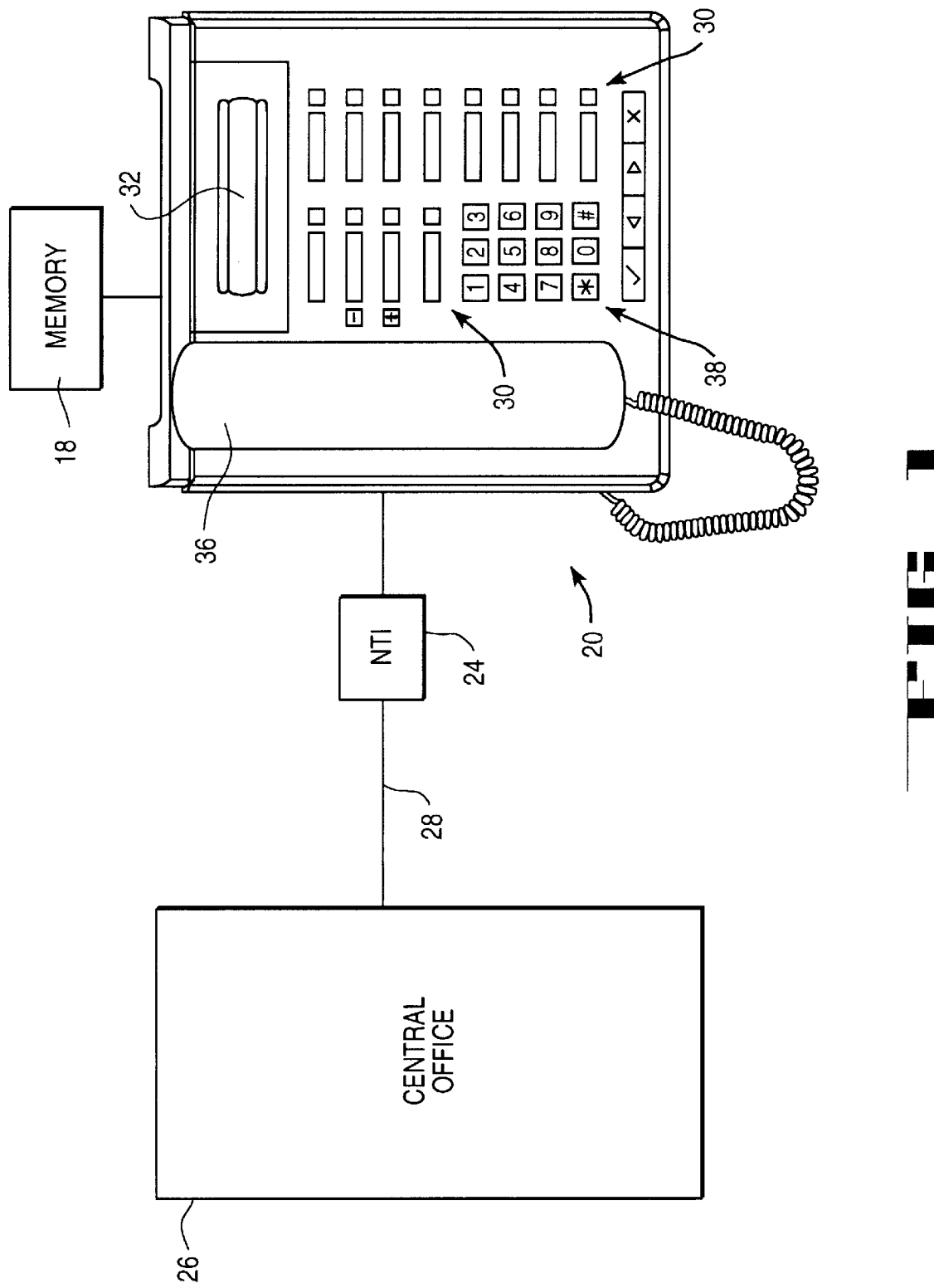
FIG. 1 is a schematic view of an ISDN terminal connected to a central office according to the present invention.

FIG. 1 shows an ISDN terminal 20 connected to an ISDN central office 26 via an ISDN line 28 according to the claimed invention. Although a digital feature phone is shown in FIG. 1, other ISDN terminals such as a personal computer or a digital fax machine with memory can be substituted without deviating from the invention. The digital feature phone has a memory 18 which can be used to store keymap data. As will be described more fully below, the stored keymap data may be uploaded to the central office 26 from a second ISDN line that is remote from the first ISDN line 28 on which the phone was originally initialized. Feature keys 30 are utilized to initialize access by the computer to ISDN telecommunications. As will be more fully explained below, the display 32 exhibits a menu of call service feature options from which a subscriber can select. The menu may also display an option prompting a subscriber to assign a feature key to each call service feature after all of the call service feature choices are made or, alternatively, after each call service feature has been selected. A network termination 1 (NT1) 24 is used to pass the feature and keymap information from the terminal 20 to the central office 26, but the use of an NT1 is not critical to the invention. The feature phone 20 also includes a conventional handset 36 and keypad 38.

FIG. 2 shows a flow diagram for initializing an ISDN terminal. The best mode for practicing the claimed method for ISDN terminal-initialization will be described by way of an example. In step 50, a subscriber selects which call service feature(s) with which to provide the terminal. The set of features decided upon constitutes a portion of the TSP for the terminal, and in a preferred embodiment, the TSP is determined utilizing the National ISDN (NI) protocol. Using the NI protocol, the terminal instructs the central office to transmit data which is visually displayed on the terminal to prompt the subscriber to select from a menu of services. Examples of a few of the services offered include call waiting, caller-ID, and call forwarding. The selected features are entered into the terminal's memory.

If conventional practices were to be followed in making the connection to the central office to select call service features and to configure a keymap, the subscriber must acquire a Service Profile Identifier (SPID) which the phone company assigns to the subscriber's terminal when the subscriber first informs the phone company of an intention to initiate service to the terminal. The SPID identifies the subscriber's terminal to the central office. However, for the method of FIG. 2, a universal SPID could be utilized. The universal SPID does not identify the subscriber's particular terminal to the central office, but it enables the connection between the terminal and the central office to be made, allowing the terminal to communicate to the central office the keymap information for the terminal. After the central office receives the keymap information, it sends the terminal a unique SPID specific to the terminal. The unique SPID is stored in the terminal for future use. The universal SPID is thus used only for a new subscription, not for updates. The advantage of utilizing a universal SPID is that it obviates the need for the subscriber to communicate a request to the central office to initiate service prior to initialization of the terminal.

In step 52, the subscriber creates a keymap by assigning each selected call service feature to a particular feature key or set of feature keys 30 of the terminal 20. This step could also be performed utilizing an NI-compliant device. The determination of the keymap may be performed in conjunction with the selection of the call service features so that a menu option would be displayed after each feature is selected, prompting the subscriber to assign the feature to a feature key 30. For example, a menu might offer the subscriber the option of selecting a call waiting feature. If the subscriber selects this feature, another menu would prompt the subscriber to select a feature key which would activate call waiting during normal operation of the terminal. In this manner, the subscriber has the flexibility to arrange the keymap in a configuration which is most compatible with the subscriber's needs. As shown in step 54, the keymap data is entered into the memory 18 of the terminal 20 of FIG. 2.

As an alternative to utilizing an NI feature phone, the terminal could be equipped with software which displays menus from which the subscriber can configure a keymap in a purely local manner. The program would automatically enter each selection into the terminal's memory, thereby constructing the keymap.

Using the universal SPID, the subscriber connects the terminal 20 to the central office 26 via a first ISDN line 28, as shown in step 56, and then uploads the selection of service features and the keymap to the central office in step 58. The subscriber initiates a D-channel call to the central office transmitting the universal SPID to the central office. After the central office has received the universal SPID, the terminal uploads the keymap. A central office software program may scan the features which the subscriber has chosen and transmit that information to the central office's billing programs so that the subscriber would automatically be billed without a database technician manually entering the TSP data into a database. Included in the uploaded information is how many directory numbers the subscriber selects for access to the terminal. Upon receipt of the uploaded information, the central office automatically downloads the unique SPID and the directory number(s) to the terminal.

Step 60 illustrates a step in which the central office 26 downloads the specific SPID and billing information representative of the call service features subscribed to by the terminal 20. After the subscriber has uploaded the keymap data, the central office calculates the billing rate for the call service features and downloads the billing information over the D-channel in the form of display information elements (DIE). The DIE are displayed on the terminal's display window 32. In this manner the subscriber has the opportunity to consider the cost of the selected call features before the subscriber has already made use of them and is obligated to pay for the use. If the subscriber reconsiders at step 62 and decides to cancel or add one or more of the services, the subscriber revises the selection of call service features and the first keymap at step 64, and the process returns to step 60 to receive the new billing information. However, the downloaded SPID does not change. When the subscriber agrees to accept the billing rate at step 62, the initialization process is concluded at step 63.

As previously noted, the preferred embodiment is one in which a universal SPID is utilized in uploading the keymap data to the central office. If the subscriber has locally pre-initialized the terminal, and the subscriber has not communicated with the central office to obtain a standard SPID, use of the universal SPID can expedite the initialization process. The subscriber initiates a D-channel call sending the universal SPID to the central office. Once the D-channel connection is established, the subscriber uploads the keymap data to the central office. The central office, upon receipt of the keymap data, designs and transmits a SPID specifically assigned to the terminal for use in all future calls made by the phone. An alternative to the use of the universal SPID as the means of enabling communication between the central office and an "anonymous" terminal is the creation of a new message type to be sent to the central office specifically for such needs.

Often, after a subscriber initiates phone service, the subscriber's service needs change, requiring an update of the keymap. For example, a growing business might require additional services, such as conference calling or call waiting, due to an increase in activity. It is often important that the business customer be able to change its service quickly. The process flow of FIG. 2 can be used to upload an updated feature selection and an updated keymap to the central office 26. In steps 50, 52 and 54, the subscriber creates the "second" keymap and enters the updated keymap into the ISDN terminal's memory 18. Then, in steps 56 and 58 the updated keymap information is uploaded to the central office. Again, the preferred mode is to perform the upload over the D-channel, but the connection is made at step 56 using the specifically assigned SPID, rather than the universal SPID. If additional directory numbers are requested, the central office will automatically download the new directory numbers as previously discussed. Likewise, any additional service features would be activated upon uploading the updated keymap. The update of a business customer's keymap can thus be activated almost simultaneously with the request.

Another common requirement for the subscriber of an ISDN phone service is the ability to move the phone from one line to another and be able to make full use of the call service features of the subscriber's keymap. An example would be a salesperson who uses a digital phone in communicating with clients both at an office and at several other locations. The digital phone has certain features, such as conference calling and abbreviated dialing, in a keyboard configuration suited to the salesperson's needs. Optimally, the digital phone should be transportable between the office and home, providing the full range of call service features and the same keymap in all locations. Utilizing prior art technology, the use of an ISDN terminal in such a manner is problematic because each time the terminal is moved to a new line, in order to access the same keymap for the terminal, the subscriber must place a service order request with the central office and wait until the service order is processed before the keymap is available.

A method for initializing an ISDN terminal on a second line according to the present invention is illustrated in steps 66 through 70 of FIG. 3. In step 66, the terminal is first connected to the second line, remote from the first line. In step 68, the first keymap, which was entered into the memory of the terminal in step 54 of FIG. 2, is uploaded to the central office 26 after connectivity is established between the terminal 20 and the central office. While not shown in FIG. 3, step 68 is preferably followed by the steps 60, 62, 63 and 64 of FIG. 2, in which billing information is downloaded from the central office for presentation to the subscriber. At times, the central office that supports telecommunications along the second ISDN line is a different central office than the one that supports telecommunications along the ISDN line of the original initialization. Since billing practices vary among central offices, repeating steps 60, 62, 63 and 64 following the upload at step 68 allows the subscriber to modify the selection of features, if the monthly charge is greater or less than the monthly charge that applies to the original initialization location. After the subscriber agrees to the monthly charge at step 62, the initialization process is concluded at step 63.

Alternatively, if the subscriber has updated the terminal's service features and keymap since first activating ISDN service, step 70 illustrates the step of uploading the updated service and keymap information. If additional directory numbers are requested in the update, these would be automatically downloaded to the terminal after the upload of the updated service and keymap information. After uploading, the terminal has full use of the uploaded call service features which were available on the first line. While not shown in FIG. 3, steps 60, 62, 63 and 64 of FIG. 2 are preferably repeated each time that there is a modification in the selection of features available to the terminal (e.g., the feature phone 20 of FIG. 1) at a particular site and each time that the terminal is initialized at a new site.

The above described invention has the advantage of eliminating duplication of effort by the subscriber and the central office in the initialization of an ISDN terminal. Unlike prior art methods, it is unnecessary to have a database administrator manually enter the keymap information into a database at the central office. The keymap information is entered into the terminal once by the subscriber, uploaded into the central office, and the terminal is then fully functional. Additionally, the subscriber does not have to 32 wait for a service order to be processed when service is initiated or updated. The only lag time the subscriber encounters is the time required to preinitialize the terminal and to upload the data. Finally, the method provides the subscriber with a practical option of using the terminal at sites remote from the ISDN line on which the terminal was originally initiated.

What is claimed is:

1. A method for initializing ISDN terminals comprising the steps of:

selecting ISDN service features available to operation of a particular ISDN terminal;

formulating a first keymap, said first keymap representing assignments of said selected ISDN service features to feature keys associated with said ISDN terminal;

following said formulation of said first keymap, connecting said ISDN terminal and a central office via a first ISDN line; and uploading information indicative of said selected ISDN service features and said first keymap over said first ISDN line from said ISDN terminal to said central office.

2. The method of claim 1 comprising the further steps of:

after uploading said first keymap, entering updated data into memory of said ISDN terminal, said updated data including an updated keymap reflecting the assignment of at least one additional or less ISDN service feature to at least one additional or less feature key of said ISDN terminal; and uploading said updated keymap from said ISDN terminal to said central office via said first ISDN line.

3. The method of claim 1 comprising the further steps of:

after uploading said first keymap, connecting said ISDN terminal to a second ISDN line that is remote from said first ISDN line; and uploading said first keymap from said ISDN terminal to said central office over said second ISDN line.

4. The method of claim 1 comprising the further steps of:

during said connecting step, transmitting a Universal SPID from said ISDN terminal to said central office via said first ISDN line;

receiving a unique SPID particular to said ISDN terminal from said central office;

after said uploading step and while still connected to said central office, receiving data from said central office representative of monthly charges for said ISDN service features and enabling approval and disapproval.

5. The method of claim 2 comprising the further steps of:

after uploading said updated keymap, connecting said ISDN terminal to a second ISDN line remote from said first ISDN line; and uploading said updated keymap from said ISDN terminal to said central office over said second ISDN line.

6. The method of claim 1 further comprising the step of entering said keymap into a memory of said ISDN terminal.

7. The method of claim 6 wherein said uploading step includes uploading said first keymap from said memory of said ISDN terminal to said central office.

8. The method of claim 1 wherein said step of connecting said ISDN terminal and said central office includes transmitting a subscription message from said ISDN terminal to said central office such that said central office is notified that said ISDN terminal is initiating a new keymap.

9. A system for initializing an ISDN terminal comprising:

input means for entering a first keymap into a memory of said ISDN terminal, said first keymap representing a correlation between feature keys associated with said ISDN terminal and selected ISDN service features;

an ISDN line connecting said ISDN terminal to a central office; and means connected to said memory for transmitting a universal SPID to said central office and for identifying said first keymap to said central office via said ISDN line.

10. The system of claim 9 wherein said identifying means is enabled to identify an updated keymap, said updated keymap reflecting the assignment of said at least one additional or less ISDN service feature to at least one additional or less corresponding feature key of said ISDN terminal, from said ISDN terminal to said central office.

11. The system of claim 9 wherein said identifying means is enabled to identify said first keymap from said ISDN terminal to said central office via a second ISDN line remote from said first ISDN line.

12. The system of claim 9 wherein said ISDN terminal is a digital feature phone.

13. A method for initializing ISDN terminals comprising the steps of:

assigning at least one ISDN call service feature to at least one feature key associated with an ISDN terminal such that each of said at least one ISDN service feature uniquely corresponds to at least one feature key, said correspondence between said at least one feature key and said at least one ISDN service feature constituting a first keymap;

establishing a D-channel connection on an ISDN between said ISDN terminal and a central office;

transmitting a universal SPID from said ISDN terminal to said central office via said D-channel connection; and uploading said first keymap from said ISDN terminal to said central office.

14. The method of claim 13 comprising the further steps of:

after transmitting said universal SPID, receiving a unique SPID specific to said terminal from said central office; and receiving data at said ISDN terminal from said central office, said data being representative of a billing rate for each of said ISDN call service features.

15. The method of claim 13 comprising the further steps of:

after uploading said first keymap, forming an updated keymap reflecting the assignment of at least one additional or less ISDN service feature to at least one additional or less feature key of said ISDN terminal; and uploading said updated keymap from said ISDN terminal to said central office via a first ISDN line.

16. The method of claim 13 comprising the further steps of:

after uploading said first keymap, connecting said ISDN terminal to a second ISDN line that is remote from said first ISDN line from which said D-channel connection is established; and uploading said first keymap from said ISDN terminal to said central office via a first ISDN line.

17. The method of claim 15 comprising the further steps of:

after uploading said updated keymap via said first ISDN line, connecting said ISDN terminal to a second ISDN line that is remote from said first ISDN line; and uploading said updated keymap from said ISDN terminal to said central office over said second ISDN line.

18. The method of claim 13 wherein said uploading step includes uploading data requesting a quantity of directory numbers to be assigned to said terminal and further comprising the further step of:

downloading at least one directory number from said central office, said at least one directory number being downloaded in response to said request of a quantity of directory numbers.

19. The method of claim 14 wherein said receiving step includes receiving said billing rate data from said central office in the form of Display Information Elements (DIE) over said D-channel, said DIEs being visually displayed on a display unit of said ISDN terminal.

20. The method of claim 13 wherein said step of establishing a D-channel connection between said ISDN terminal and said central office includes transmitting a subscription message that is dedicated to establishing terminal-to-central office communications for initiating a new keymap.

* * * * *